United States Patent
Dong

(10) Patent No.: US 9,043,936 B2
(45) Date of Patent: *May 26, 2015

(54) COMMUNICATIONS DEVICE

(75) Inventor: Olivier Dong, Berkshire (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 163 days.

This patent is subject to a terminal disclaimer.

(21) Appl. No.: 13/576,509

(22) PCT Filed: Mar. 16, 2011

(86) PCT No.: PCT/JP2011/057070
§ 371 (c)(1),
(2), (4) Date: Aug. 16, 2012

(87) PCT Pub. No.: WO2011/118670
PCT Pub. Date: Sep. 29, 2011

(65) Prior Publication Data
US 2012/0304312 A1    Nov. 29, 2012

(30) Foreign Application Priority Data

Mar. 25, 2010 (GB) .................................. 1005034.2

(51) Int. Cl.
*G06F 21/24* (2006.01)
*G06F 9/44* (2006.01)
*G06F 3/048* (2013.01)
*G06F 21/00* (2013.01)
*H04M 1/725* (2006.01)

(52) U.S. Cl.
CPC .............. *G06F 9/4443* (2013.01); *G06F 3/048* (2013.01); *G06F 21/00* (2013.01); *H04M 1/72583* (2013.01)

(58) Field of Classification Search
CPC .................................. G06F 3/48; G06F 21/24
USPC .............. 726/28; 715/835; 455/558, 418, 420
See application file for complete search history.

(56) References Cited

U.S. PATENT DOCUMENTS

| | | | |
|---|---|---|---|
| 7,962,762 | B2 | 6/2011 | Kirsch et al. |
| 2004/0093592 | A1 | 5/2004 | Rao |
| 2007/0244926 | A1 | 10/2007 | Vitanov et al. |

(Continued)

FOREIGN PATENT DOCUMENTS

| | | |
|---|---|---|
| CN | 1933620 A | 3/2007 |
| CN | 101277498 A | 10/2008 |

(Continued)

OTHER PUBLICATIONS

International Search Report, PCT/JP2011/057070, May 17, 2011.

(Continued)

*Primary Examiner* — Jeffrey Pwu
*Assistant Examiner* — Samuel Ambaye

(57) ABSTRACT

A mobile device is provided having a smart card. The smart card is programmed with UICC applications metadata that is provided to the mobile device during a power-up or reset routine. The mobile device uses the UICC applications metadata to generate a user interface that allows a user to launch directly an application on the smart card. Icons for the UICC applications can be displayed together with icons for applications residing on the mobile device. In this way, the user selection of UICC resident applications is facilitated and can be made transparent to the user.

22 Claims, 5 Drawing Sheets

(56) References Cited

U.S. PATENT DOCUMENTS

| | | |
|---|---|---|
| 2009/0191917 A1 | 7/2009 | Zappulla et al. |
| 2010/0035651 A1 | 2/2010 | Dong |
| 2010/0197350 A1 | 8/2010 | Jeung |
| 2010/0232386 A1 | 9/2010 | Dong |
| 2011/0136471 A1 * | 6/2011 | Chen et al. .................... 455/411 |

FOREIGN PATENT DOCUMENTS

| | | | |
|---|---|---|---|
| EP | 0 896 491 | 2/1999 | |
| EP | 1 703 751 | 9/2006 | |
| EP | 1 962 482 | 8/2008 | |
| EP | 1962482 A1 * | 8/2008 | ............... G06F 3/048 |
| JP | 11-155002 | 6/1999 | |
| JP | 2001291039 A | 10/2001 | |
| JP | 2004318871 A | 11/2004 | |
| JP | 2007116509 A | 5/2007 | |
| JP | 2008-522301 | 6/2008 | |
| JP | 2008-271121 | 11/2008 | |
| KR | 10-0806037 | 2/2008 | |
| WO | WO 2007/058241 | 5/2007 | |
| WO | WO 2008/044597 | 4/2008 | |
| WO | WO 2008/119380 | 10/2008 | |
| WO | WO 2009/025375 | 2/2009 | |
| WO | WO 2009/051377 | 4/2009 | |

OTHER PUBLICATIONS

Extented European Search Report—EP 11 75 9475—Feb. 24, 2014.
Smart Cards; Card Application Toolkit (CAT) (Release7); ETSI TS 102 223, IEEE, Lis, Sophia Antipolis Cedex, France, vol. SCP-WG3, No. v7.10.0, Feb. 1, 2008, XP014041612, ISSN: 0000-0001.
Chinese Office Action dated Mar. 18, 2014; Application No. 201180011605.5.

* cited by examiner

com-

COMMUNICATIONS DEVICE

TECHNICAL FIELD

The present invention relates to communications equipment and in particular to mobile equipment (ME) having a Universal Integrated Circuit Card (UICC) therein and the way in which software applications can run on the UICC and interact with the ME. The invention also relates to the mobile equipment, the UICC and to the methods performed therein.

BACKGROUND ART

MEs such as mobile (cellular) telephones include a UICC which, among other things, holds secure data for identifying the user to the core network. The UICC is a smart card that has an inbuilt microprocessor and memory that can run a number of software applications. The UICC is a very secure element in a mobile communication system. Moreover, thanks to the definition of the high speed protocol and the increase in the UICC flash memory size, the UICC can now be considered as a good location for applications which require a high security level, such as mobile payment applications.

In one existing implementation, UICC applications are accessible via the UICC services menu (or USIM toolkit menu). The End User has to pass through several menus and sub-menus (which are dynamically built step by step using USIM toolkit proactive commands at the time the User enters the UICC services menu) before reaching the actual UICC applications. FIGS. 4a and 4b illustrate the steps performed to access a UICC application—in this example a game application "Enigma". In view of the messages transmitted between the ME and the UICC (illustrated in FIG. 4b) and in view of the dynamic generation of the menus and sub-menus, the whole process can take quite a long time especially on low performance mobile terminals. Another drawback with this existing implementation is due to the present ISO interface: most of the existing proposed items in the UICC services menus are currently displayed under text format. Adding icons/pictures to these menu items would increase the amount of data to be sent from the UICC to the ME and would therefore slow down the presentation/display of UICC services menus/sub-menus items to the end user.

Another implementation, based on the Smart Card Web Server (SCWS), has already been defined by ETSI SCP (Rel-7)/OMA but it has not yet been implemented today. For many, the solution based on the SCWS would be the heart of future generations of User Interface to access the content of a UICC, i.e. the end user will be using a Web page-like interface to access the content of a UICC (applications, phonebook, SMS, local web server, etc. . . . ). The main reason why the SCWS is not really deployed today is due to the protocol stack and physical interface underneath. The SCWS is based on HTTP which usually runs over a TCP/IP stack. The support of TCP/IP in the UICC has been defined in ETSI SCP Rel-7 (see ETSI standards documents TS 102 221, TS 102 600 and TS 102 223). There are currently no commercial products (both UICC and ME) that support this feature yet. Moreover, there are also no existing mobile handsets that support the defined High Speed Protocol (USB) physical interface.

Although the SCWS is identified as the right candidate for the next generation of User Interface for accessing the UICC content, accessing UICC applications will still require several steps, i.e. launch the ME Browser application and enter the SCWS URL, browse the UICC until reaching the application's location, then select/launch the application. The inventor has realised that this process will still be cumbersome for the end user and that a more user friendly way for users to access the UICC applications would be desirable.

SUMMARY OF INVENTION

In one embodiment, in order to achieve this and to enhance further the user experience, the inventor proposes to define a new protocol that allows the ME to retrieve a set of relevant data related to the available UICC applications so that all these UICC applications can be presented/shown and made accessible to the end user in the same manner as ME applications (usually presented as icons). The proposed protocol will also allow the end user to directly launch a UICC application by clicking/selecting the corresponding icon. In a preferred embodiment, the menu items (e.g. icons) for UICC applications and ME applications are displayed together in a unified User Interface, so that the user is unaware of whether or not the application is stored on and run by the UICC or the ME.

The following example illustrates the result that would be achieved using the proposed solution:
- considering an "iPhone"-like User Interface, icons associated with UICC applications will be directly shown in the main menu like any other ME applications.
- considering an ME User Interface which contains different folders for different types of applications, e.g. Games, Tools, etc. . . . , the UICC applications' icons could be dispatched in these folders beside the ME application's icons of the same category, e.g. UICC Games applications' icons will be located in the same folder as ME Games applications icons, etc.

The proposed new protocol may use and comprise the following:
- Define metadata that will characterize UICC applications (e.g. category, name, icon (to be presented to the user), required parameters to launch an application, dependencies to the available network services (e.g. packet service), etc . . . )
- Define a new dedicated Elementary File (EF) on the UICC (linear fixed type EF, one record per UICC application) to store all these metadata related to the UICC applications
- Add a new service in the services declaration routine for both the UICC and ME
- Update the ME power up sequence by including the reading of this new Elementary File
- Once the ME has retrieved the Elementary File, the ME will build the UI for these UICC applications based on its own UI architecture and capabilities
- Define a module in the ME which will interact with the end user in case the metadata requires some additional operations before launching the UICC application (e.g. login/password, check availability of network services, etc)
- Define a new Envelope command allowing the ME to actually request the UICC to launch a selected UICC application In one embodiment, the data required to offer the direct access will be transferred from the UICC to the ME during the ME power up. This will add a few milliseconds in the power up process and will be fully transparent for the end user. Then, when the end user launches a UICC application, a single Envelope command is sent by the ME to the UICC.

Comparing this new process with the existing implementation based on the SIM Toolkit, the new Envelope command (launch UICC application) will simply replace all the needed Setup Menu/Envelope (menu selection)/Select Item/ . . . commands (illustrated in FIG. 4b) that are required in the existing implementation. Additionally, the end user no longer has to interact several times with the SIM services menu before reaching the UICC applications (this is a significant improvement of the user experience).

According to one aspect, the present invention provides a mobile device comprising: a UICC interface for interfacing with a UICC; a UICC module that communicates with the UICC via the UICC interface; a memory for storing applications to be run by the mobile device; and a UI module for providing a user interface to allow a user to access applications; wherein the UICC module is arranged to obtain from the UICC before or independent of any user interaction with the user interface, UICC applications metadata for UICC applications that are available on the UICC and to store the UICC applications metadata in the memory; wherein the UI module uses the UICC applications metadata to generate a user interface via which a user can select a UICC application to be launched; and wherein in response to a user input selecting a UICC application, the UICC module sends a command to the UICC to launch the selected UICC application. In one embodiment, the mobile device obtains the UICC applications metadata during a power-up or reset routine. In another embodiment, the mobile device starts to obtain the UICC applications metadata prior to the display of a user interface that allows the user to navigate to applications on the mobile device or on the UICC.

In one embodiment, the UICC applications metadata comprises conditions required to launch a UICC application and the UICC module checks, in response to a user selection of a UICC application, the conditions associated with the selected UICC application prior to sending the command to launch the selected UICC application. The conditions may define a required network service. In this case, the UICC module may check that the required network service is available and sends the command to launch the selected UICC application only if the required network service is available. The conditions may instead or in addition define that user authentication is required. In this case, the UICC module would perform user authentication and would send the command to launch the selected UICC application only if user authentication is successful. The UICC module may perform authentication by prompting the user to enter a user name and/or password and by comparing the entered user name and/or password with a user name and/or password provided in the UICC applications metadata.

In one embodiment, the UICC applications metadata includes an icon or a pointer to an icon and the UI module generates the user interface using the icons.

The UI module may generate a user interface that displays a mix of applications available on the mobile device and on the UICC. The UICC applications metadata may include category data which the UI module can use to group together, on the user interface, UICC applications and mobile device applications of the same category.

In one implementation, the UICC applications metadata is stored on the UICC within an Elementary File and the UICC module reads the metadata from said Elementary File. The invention also provides a UICC comprising: an interface for interfacing with a mobile device; a memory for storing UICC applications and UICC applications metadata relating to the UICC applications; and a control module that communicates with the mobile device; wherein the control module is operable, before any user interaction to provide the mobile device with the UICC applications metadata and is operable to launch a UICC application in response to receiving a command to launch that UICC application from the mobile device. In the preferred embodiment, the control module forms part of the operating system of the UICC, but in other embodiments, the control module may be provided as one or more separate modules on the UICC.

The UICC applications metadata may include conditions required to launch a UICC application for use by the mobile device to check that the required conditions have been met prior to sending the command to launch the selected UICC application. The conditions may define, for example, a required network service and/or that user authentication is required. Where user authentication is required, the UICC applications metadata will typically includes a user name and/or password.

The UICC applications metadata may include an icon or a pointer to an icon for display to the user on the user interface (e.g. display). The UICC applications metadata may also include category data identifying a category associated with each UICC application.

In one implementation, the UICC applications metadata is stored within an Elementary File and the USAT module provides the metadata from said Elementary File to the mobile device.

If the UICC applications metadata is changed, for example if the UICC applications are updated, then the USAT module can trigger the mobile device to re-read the application's metadata Elementary File. In this way, if the metadata changes, the mobile device can also be updated to reflect the new data.

The present invention also provides corresponding methods and computer implementable instruction products. The computer implementable instructions may be stored on a recording medium such as a CD-ROM or the like.

These and other aspects of the invention will become apparent from the following detailed description of exemplary embodiments described with reference to the accompanying Figures in which:

BRIEF DESCRIPTION DRAWINGS

FIG. 4b is a communications timing diagram illustrating the communications between the ME and the UICC when the user selects the UICC application of FIG. 4a.

DESCRIPTION OF EMBODIMENTS

Overview

As will be explained in more detail below, the main idea of this embodiment is to define a new protocol allowing the ME to retrieve a set of relevant data related to the UICC applications so that all these UICC applications can be presented/shown and made accessible to the end user in the same (or at least similar) manner as ME applications (usually presented as icons). The proposed protocol will also allow the end user to directly launch a UICC application by clicking/selecting the corresponding icon without entering the existing UICC services menu.

Figure 1:
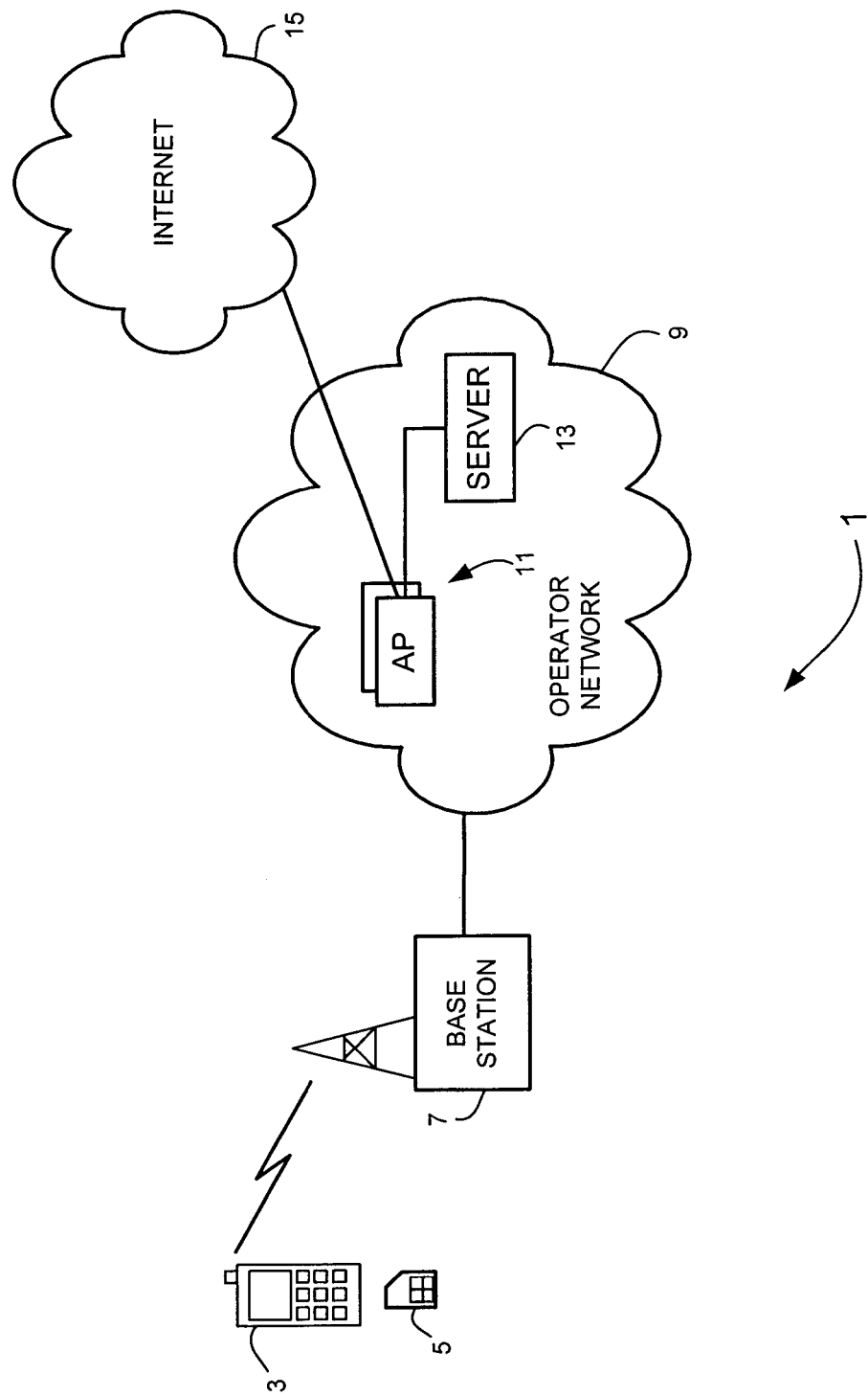
FIG. 1 is a block diagram illustrating the main components of a mobile communications system.

FIG. 1 is a block diagram showing the main components of a mobile communications system 1. As shown, the system includes mobile equipment (ME) 3, such as a cellular telephone; a UICC 5 that is normally mounted within the ME 3; a base station 7 for transmitting signals to and for receiving signals from the ME 3; and an operator network 9 that provides data and voice call services to the ME 3. As shown, the operator network 9 includes a number of access points 11 to which the ME 3 connects to gain access to servers 13 in the operator network 9 or servers (not shown) in the Internet 15.

Figure 2:
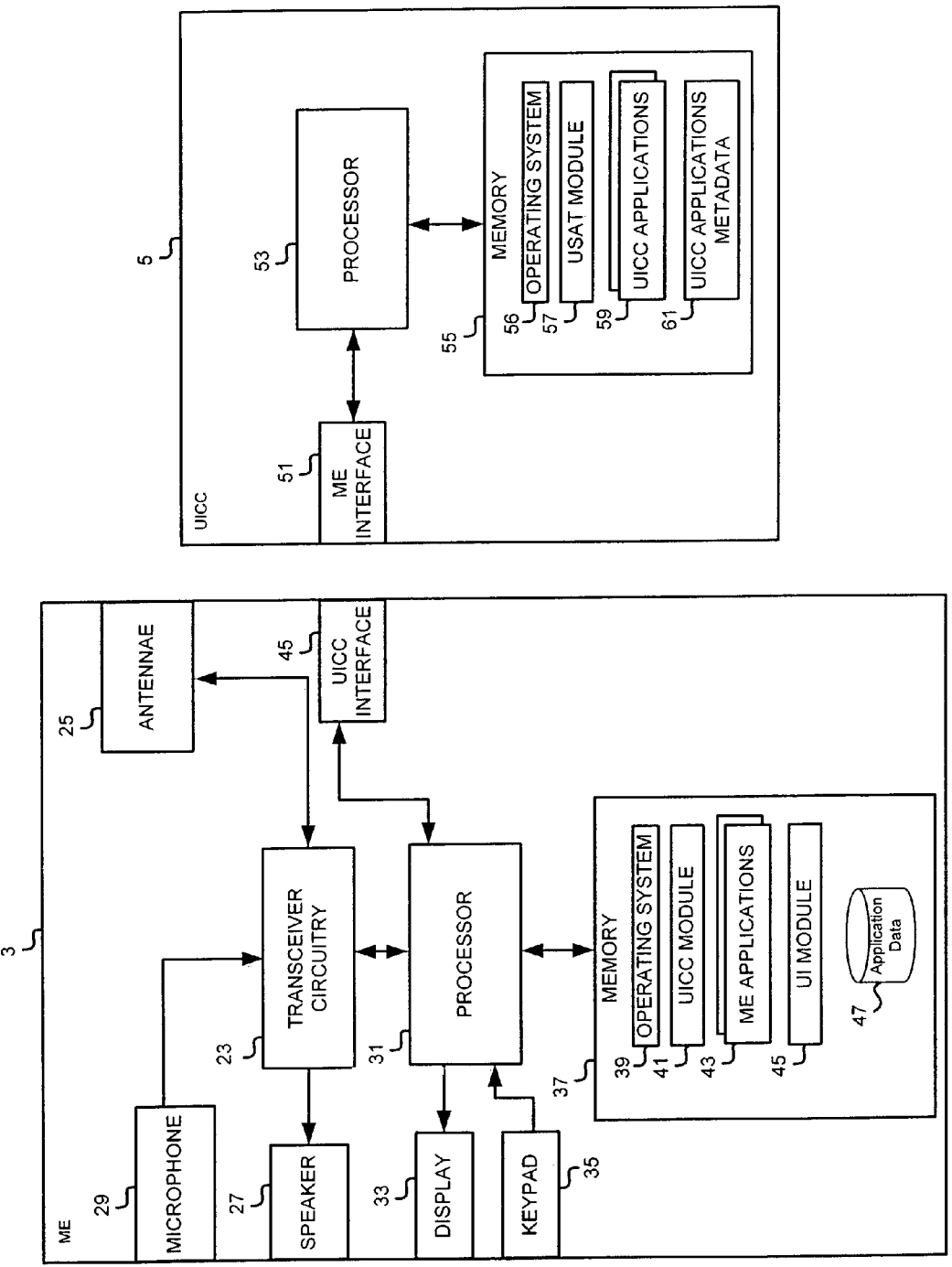
FIG. 2 is a block diagram illustrating the main components of an ME and a UICC forming part of the system shown in FIG. 1.

FIG. 2 is a block diagram showing the main components of the ME 3 and the UICC 5 used in this embodiment. As shown, the ME 3 includes transceiver circuitry 23 which is operable to transmit signals to and to receive signals from the base station 7 via one or more antennae 25. As shown, the transceiver circuitry 23 is connected to a loudspeaker 27 and a microphone 29 in the normal way to allow the user to make and receive calls. The ME 3 also includes a processor 31 for controlling the operation of the ME 3 and for controlling the user interaction with the ME via display 33 and keypad 35. The processor 31 operates in accordance with software instructions stored within memory 37. As shown, these software instructions include, among other things, an operating system 39; a UICC module 41 for controlling the interaction between the ME 3 and the UICC 5; a number of ME applications 43; and a UI (User Interface) module 45. The memory 37 also stores application data 47 that includes icons for the available applications and links to allow the application to be started if the application's icon is selected by the user. The ME 3 also includes a UICC interface 45 which provides the physical interface to the UICC 5. In this embodiment, the UICC module 41 is a separate software module in the ME 3. As those skilled in the art will appreciate, in other embodiments, the UICC module 41 may be provided as part of the operating system 39.

As shown in FIG. 2, the UICC 5 includes an ME interface 51 for providing the physical interface to the ME 3. The UICC 5 also includes a processor 53 which operates in accordance with software instructions stored in memory 55. As shown, these software instructions include an operating system 56, a USAT module 57 (Universal SIM (subscriber Identity Module) Application Toolkit) and a number of applications 59. The USAT module 57 provides mechanisms that allow the UICC applications 59 to interact and operate with the ME 3 or a remote entity in the operator network 9 (or the Internet 15) which supports the specific mechanism(s) required by the UICC application 59. The memory 55 also includes UICC applications metadata 61 that identifies all the different UICC applications 59 that are available to the user and that includes data relevant to the running of each UICC application 59.

Figure 3:
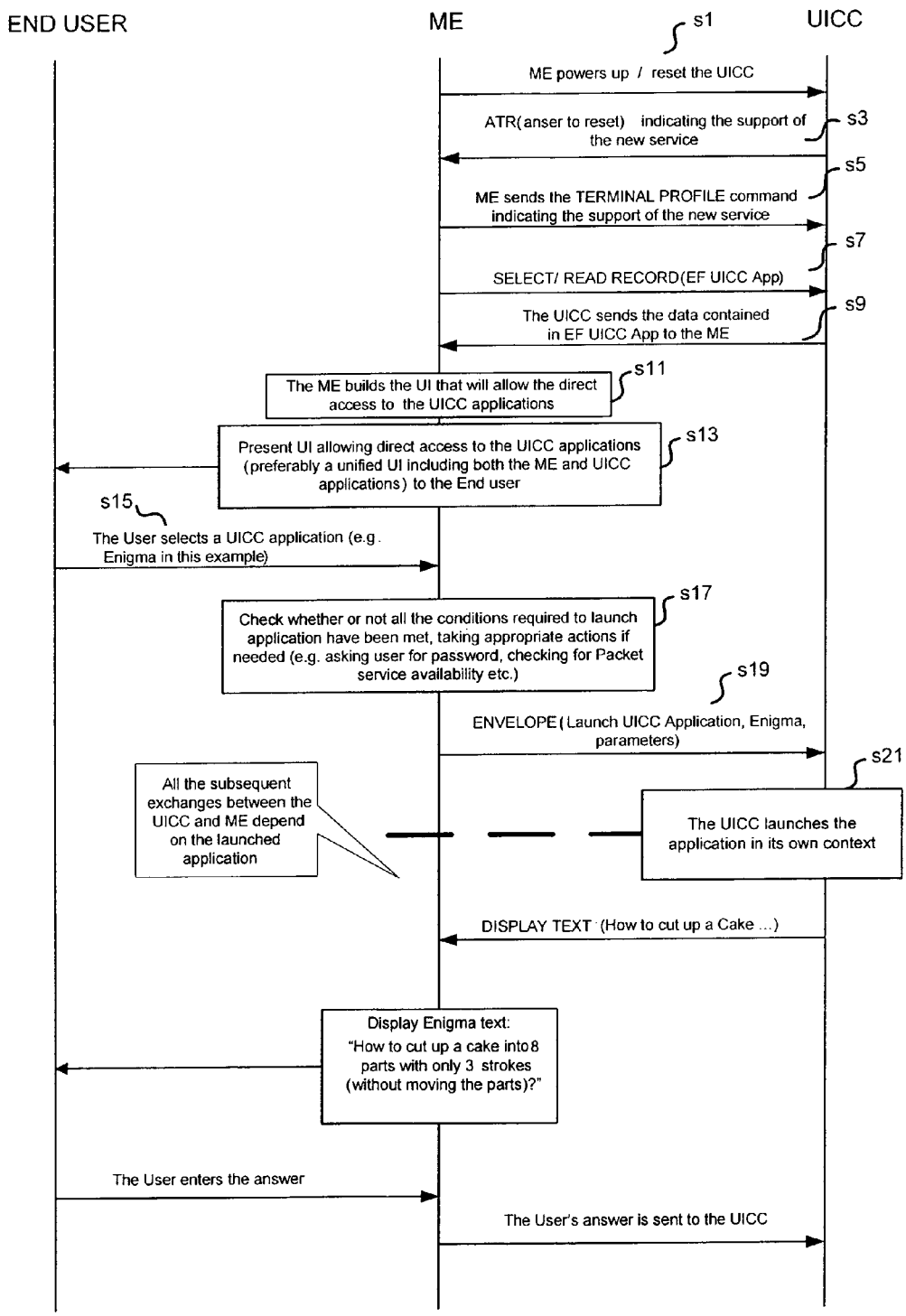
FIG. 3 is a communications timing diagram illustrating communications between the ME, the UICC and the end user when accessing a UICC application.
Figure 4A:
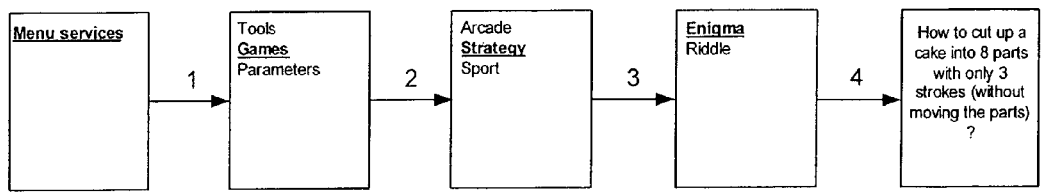
FIG. 4a illustrates a sequence of displays that are dynamically generated to access a UICC application using an existing design of UICC and ME.
Figure 4B:
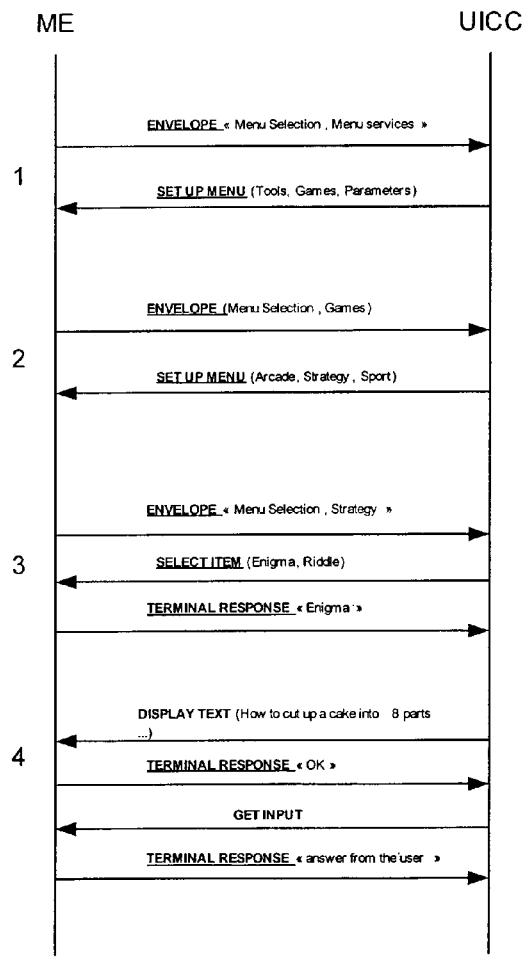

The way in which the ME 3 and UICC 5 operate in this embodiment will now be described with reference to FIG. 3. Initially upon power up or reset, the UICC module 41 sends the UICC 5, in step s1, a power up or reset signal. In step s3, the operating system 56 responds to this signal with the ATR (Answer To Reset) response that indicates the services that the UICC 5 supports. In this embodiment, the ATR response will include data indicating that the UICC 5 supports the new service for providing direct access to the UICC applications 59, proposed in the present application. In step s5, the UICC module 41 responds to the ATR message with a Terminal Profile command that informs the UICC 5 of the services supported by the ME 3. In this embodiment, this Terminal Profile command will include data indicating that the ME 3 can support the new direct access to UICC applications service. In step s7 the UICC module 41 sends a series of SELECT and READ RECORD APDU commands in order to access the Elementary File (EF UICC APP in this example) that contains the metadata 61 for the UICC applications 59. In response to receiving these commands, the operating system 56 sends, in step s9, the metadata 61 held in EF UICC App to the UICC module 41. The UICC module 41 stores the metadata 61 with the application data 47 for subsequent use when the user seeks to access an application via the user interface. Once the ME 3 has all the metadata 61, the UI module 45 can use the metadata 61 in step s11 to build a user interface that will allow the user to gain direct access to the UICC applications 59. The UI module 45 will typically generate the user interface when the user inputs a predefined input (for example presses a menu key on the keypad 35) requesting the available applications, although the user interface could be generated in advance and stored in memory 37. In step s13, the UI module 45 presents the user interface that has been generated to the user (via the display 33), thereby allowing the user to see and select a UICC application 59 from the displayed user interface. In the preferred embodiment, the UI module 45 builds a user interface that includes icons for both ME applications 43 (determined from the application data 47 stored on the ME 3) and UICC applications 59. In this way, whether the application is an ME application 43 or a UICC application 59 can be made transparent to the user.

If the user selects to run a UICC application 59 in step s15, then in step s17, the UICC module 41 checks whether or not all the conditions required to launch the desired application have been met (determined from the metadata 61 associated with the selected UICC application that the UICC module 41 obtained in step s9). If the conditions have not been met, then the UICC module 41 takes the appropriate action, such as requesting the user to provide a login/password to authenticate the user or checking for the availability of an appropriate network service etc. Once the conditions required to launch the application have been met, then the UICC module 41 sends the UICC 5, in step s19, a command to launch the selected UICC application 59. In this example, the selected UICC application is the Enigma game. In response to receiving the launch command, the operating system 56 calls the USAT module 57 to interpret the command and, once interpreted, launches the selected application 59 in step s21. The subsequent exchanges between the UICC 5 and the ME 3 are dependent on the application that has been launched and are the same as before, and so a description of those steps shall be omitted.

Thus, as can be seen from the above description, the slow and laborious task of UICC menu navigation is performed by the faster ME processor 31 without having to communicate over the UICC interface 45. Additional time is required at start-up or reset to read the UICC applications metadata 61 from the UICC 5, but after this has been completed, the subsequent process for gaining access to the UICC applications 59 is controlled by the ME's existing menu based system for accessing the ME applications 43.

Example Implementation

A) Definition of UICC Applications Metadata 61

Metadata are data that characterize an application.
In this embodiment, the following metadata is stored for each UICC application 59:
Name: (text string, coded as for SMS Data coding scheme defined in TS 123 038)

Identifier (2 bytes): 0x0001 to 0xFFFF
Category (1 byte character): for example, "Game", "Mobile Payment", "Utility" etc.
Icon (1 byte character): This byte indicates the record in an Elementary File: "IMG", which contains the icon-image. Another-possible-way to indicate the icon is to provide a URL for the icon. In this case, a text string would be provided instead of a 1 byte character.
Network service (1 byte character): For example, no network service is required, Circuit Switched service is required, GPRS is required, EDGE service is required, PDN service is required etc.
Parental control (1 byte character): indicating if the application is available with or without restriction.
Login/password (1 byte character): indicating if a login/password is required to access the application.
The list of metadata mentioned above is, of course, not exhaustive, it could include other metadata.

B) Definition of a New Elementary File (to be Added in ETSI Ts 102 221): EF UICC App Note: The structure of the EF UICC App described below is given by way of example only. Other structures would of course be possible, for example to accommodate other metadata 61 or if different sized allocations are provided for the metadata 61 discussed above.

This new EF will be located under the Master File (MF) and will have the following structure:

TABLE 1

| Identifier: '2Fxx' | Structure: linear fixed | Optional |
|---|---|---|
| Record length: X + 7 bytes | Update activity: low | |

| Access Conditions: | | |
|---|---|---|
| READ | ALWAYS | |
| UPDATE | ADM | |
| DEACTIVATE | ADM | |
| ACTIVATE | ADM | |

| Bytes | Description | M/O | Length |
|---|---|---|---|
| 1 to X | Name | M | X bytes |
| X + 1 | Identifier | M | 2 byte |
| X + 2 | Category | M | 1 byte |
| X + 3 | Icon | M | 1 byte |
| X + 4 | Network service | M | 1 byte |
| X + 5 | Parental control | M | 1 byte |
| X + 6 | Login/password | M | 1 byte |

This is a "linear fixed" type EF: the EF is made up of a number of records; with each record containing the metadata 61 of one UICC application 59.
Content and Coding:
Name (text string, coded as for SMS Data coding scheme defined in ETSI TS 123 038)
Identifier: a unique identifier allocated by the UICC
Coding:
Valid values are defined between 0x0001 to 0xFFFF
0x0000 is reserved for future use
Category: indicate the category of the application
Coding:
'01': Game
'02': Mobile payment
'03': Utility
'04': other
Note: The list here is given as an example. Other categories could be defined.

Icon: indicate a record number in EF IMG
Note: in case the value included in the "Icon" field is not meaningful (i.e. no value or 0), the ME 3 could allocate a default icon (defined by the ME) for UICC applications 59.
Network service: indicates whether or not a network service is required Coding:
'00'; no network service required
'01': CS
'02': GPRS
'03': EDGE
'04': PDN (LTE)
Note: The list here is given as an example. Other values could be defined.
Parental control: indicates whether or not an application can be accessed in case the parental control is set.
Coding:
'00': the application is available without restriction
'01': the application must be unavailable/hidden if the Parental control is set Other values are reserved for future use.
Login/password: indicates whether or not authentication is required to run the application.
Coding:
'00': login/password not required
'01': login/password required
Other values are reserved for future use.

C) Support of the New Protocol by Both the UICC 5 and the ME 3

Figure 5:
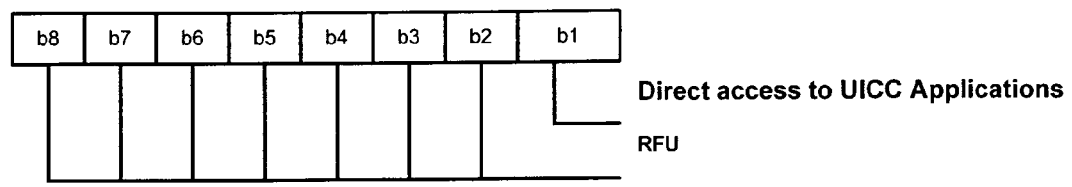
FIG. 5 is a diagram illustrating an example of the Terminal Profile structure.

1) The Terminal Profile command is used by the ME to inform the UICC about the services supported by the ME. It is proposed to allocate a new bit in the Terminal Profile command data structure in order to declare the support of this new service.
As an example, As shown in FIG. 5, bit 1 in the thirty first byte of the Terminal Profile structure (defined in TS 102 223) can be used to indicate the support of this feature (b1 set to 1 means this feature is supported).
2) If this new service is supported by the UICC 5, then the UICC 5 should declare it in the ATR (answer to reset) bytes.
The first Global Interface byte after T=15 in the ATR (defined in TS 102 221) can be used for this. For example, the existing coding of this global interface byte can be extended to introduce the support of the new service:
(The following Table 2 (Table 6.7 in ETSI TS 102 221) extracted from ETSI TS 102 221 and updated with the new input)

TABLE 2

Coding of the first $TB_i$ (i > 2) after T = 15 of the ATR

| B8 | b7 | b6 | b5 | b4 | b3 | b2 | b1 | Meaning |
|---|---|---|---|---|---|---|---|---|
| 0 | 0 | 0 | 0 | 0 | 0 | 0 | 0 | No additional global interface parameters supported |
| 1 | — | — | 1 | — | — | — | — | Low Impedance drivers and protocol available on the I/O line available (see clause 7.2.1) |
| 1 | 1 | — | — | — | — | — | — | Inter-Chip USB UICC-Terminal interface supported as defined in TS 102 600 |
| 1 | — | 1 | — | — | — | — | — | UICC-CLF interface supported as defined in TS 102 613 |

TABLE 2-continued

Coding of the first TB$_i$ (i > 2) after T = 15 of the ATR

| B8 | b7 | b6 | b5 | b4 | b3 | b2 | b1 | Meaning |
|---|---|---|---|---|---|---|---|---|
| 1 | — | — | — | 1 | — | — | — | Secure Channel supported as defined in TS 102 484 |
| 1 | — | — | — | 1 | 1 | — | — | Secured APDU - Platform to Platform required as defined in TS 102 484 |
| 1 | — | — | — | — | — | — | 1 | Data for direct UICC Applications access available |

NOTE:
Any other value is RFU.

In this embodiment, the UICC module 41 in the ME 3 controls access to the UICC application 59. To do this, the UICC module 41 is responsible for:
  storing all the metadata 61 read from the EF UICC App
  checking that all the required conditions (defined by the metadata) to launch a UICC application 59 have been met before actually sending the execution request for this application to the UICC 5.

In particular, for the parameters described above in EF UICC app, the UICC module 41 is responsible for the following actions (for the relevant UICC applications):
  Check that the required Network service is available
  Check the status of the Parental control
  Ask the user the enter login/password
Note: there may be several software modules in the ME 3 to achieve these storing and checking features. The particular arrangement is implementation specific.

D) Definition of a New Envelope Command (to be Added in ETSI Ts 102 223)

This new Envelope command will be sent from the ME 3 to the UICC 5 to actually launch the UICC application 59.
  Structure of ENVELOPE (Launch UICC Application):
  Direction: terminal (ME) to UICC.
  The command header is specified in ETSI TS 102 221 for a 3G platform and in TS 151 011 for a 2G platform.
  Command parameters/data.

TABLE 3

| Description | Clause | M/O/C | Min | Length |
|---|---|---|---|---|
| Launch UICC Application tag | 9.1 | M | Y | 1 |
| Length (A + B + C + D) | — | M | Y | 1 or 2 |
| Device identities | 8.7 | M | Y | A |
| UICC application ID | 8.vv | M | Y | B |
| UICC application login | 8.15 | C | Y | C |
| UICC application password | 8.15 | C | Y | D |

Device identities: coding defined in TS 102 223
  UICC application ID (new TLV data object to be added in TS 102 223):
  4.1. 8.vv UICC application ID

TABLE 4

| Byte(s) | Description | Length |
|---|---|---|
| 1 | UICC Application tag | 1 |
| 2 | Length = '02' | 1 |
| 3 | Identifier | 2 |

Identifier:
  values defined between 0x001 to 0xFFFF (1 to 65536)
  0 is reserved for future use
UICC application login/password: those parameters are present only if they are required by the UICC application 59.

E) UICC Applications Update Via OTA

Applications 59 located in the UICC 5 can be remotely updated by Operators/smart card vendors via an Over The Air (OTA) update mechanism. In case metadata 61 in the EF UICC App are changed (e.g. for a new icon to be displayed to the User), the UICC 5 will request the ME 3 to read again the metadata 61 using a Refresh proactive command so that the ME 3 can retrieve the updated metadata 61.

Modifications and Alternatives

A detailed embodiment has been described above. As those skilled in the art will appreciate, a number of modifications and alternatives can be made to the above embodiment whilst still benefiting from the inventions embodied therein.

In the above embodiment, the UICC applications metadata was read from the UICC during a power-up or reset procedure. In other embodiments, the UICC applications metadata may be read (or at least start to be read) at different times, but before the user starts to use (or is able to use) the user interface to select an application to be launched.

In the above embodiment, a mobile telephone based telecommunications system was described. As those skilled in the art will appreciate, the techniques described in the present application can be employed in other communications system. Other communications nodes or devices may include user devices such as, for example, personal digital assistants, portable telephones, laptop computers etc.

In the above embodiments, a number of software modules were described. As those skilled will appreciate, the software modules may be provided in compiled or un-compiled form and may be supplied to the UICC or to the ME as a signal over a computer network, or on a recording medium. Further, the functionality performed by part or all of this software may be performed using one or more dedicated hardware modules. However, the use of software modules is preferred as it facilitates the updating of the UICC 5 and of the MEs 3 in order to update their functionalities. Similarly, the functions performed by the various software modules described above could be performed by any number of separate software modules or could be performed by a single software module, such as the operating system.

In the above embodiment, the UICC interfaced with the ME via respective interfaces on each device. As those skilled in the art will appreciate, these interfaces may be physical (contact) type interfaces or they may by wireless (non-contact) type interfaces.

Various other modifications will be apparent to those skilled in the art and will not be described in further detail here.

This application is based upon and claims the benefit of priority from UK Patent Application No. 1005034.2 filed on Mar. 25, 2010, the content of which is incorporated by reference.

The invention claimed is:
1. A mobile device comprising:
  a Universal Integrated Circuit Card (UICC) interface for interfacing with a UICC;
  a UICC module operable to communicate with said UICC via said UICC interface;

a memory configured to store applications to be run by the mobile device; and a User Interface (UI) module configured to provide a user interface to allow a user to access applications, wherein said UICC module is configured to obtain from said UICC, before or independent of any user interaction with the user interface, UICC applications metadata for UICC applications that are available on the UICC and to store the UICC applications metadata in said memory, the UI module is operable to use the UICC applications metadata to generate a user interface via which a user can select a UICC application to be launched, and in response to a user input selecting a UICC application, the UICC module is operable to send a command to the UICC to launch the selected UICC application, wherein said UICC applications metadata comprises conditions required to launch one of the UICC applications, and wherein the UICC module is operable, in response to the user selection of the UICC application, to check the conditions associated with the selected UICC application prior to sending the command to launch the selected UICC application.

2. The device according to claim 1, wherein the conditions define a required network service, and wherein the UICC module is operable to check that the required network service is available and to send said command to launch the selected UICC application when said required services are available.

3. The device according to claim 1, wherein the conditions define that user authentication is required, and wherein the UICC module is operable to perform user authentication and to send said command to launch the selected UICC application when user authentication is successful.

4. The device according to claim 3, wherein the UICC module is operable to perform authentication by prompting the user to enter a user name and/or password and by comparing the entered user name and/or password with a user name and/or password provided in the UICC applications metadata.

5. The device according to claim 1, wherein said command is an Envelope command that identifies the UICC application to be launched.

6. The device according to claim 1, wherein said UI module is operable to generate a user interface that displays a mix of applications available on said mobile device and on said UICC.

7. The device according to claim 6, wherein the UICC applications metadata includes category data, and wherein the UI module is operable to group together, on the user interface, UICC applications and mobile device applications of the same category.

8. The device according to claim 1, wherein said UICC applications metadata is stored on said UICC within an Elementary File, and wherein said UICC module is operable to read the metadata from said Elementary File.

9. The device according to claim 1, wherein said UICC applications metadata is provided to the device without a UICC service menu system provided for the UICC.

10. A Universal Integrated Circuit Card (UICC) comprising:

an interface configured to interface with a mobile device;

a memory configured to store UICC applications and UICC applications metadata relating to the UICC applications; and a control module operable to communicate with the mobile device, wherein the control module is operable, before or independent of any user interaction with the UICC, to provide the mobile device with said UICC applications metadata and is operable to launch a UICC application in response to receiving a command to launch the UICC application from the mobile device, and wherein said UICC applications metadata comprises conditions required to launch the UICC application for use by the mobile device to check that the required conditions have been met prior to sending the command to launch the selected UICC application.

11. The UICC according to claim 10, wherein the conditions define a required network service.

12. The UICC according to claim 10, wherein the conditions define that user authentication is required.

13. The UICC according to claim 12, wherein the UICC applications metadata includes a user name and/or password.

14. The UICC according to claim 10, wherein the command is an Envelope command.

15. The UICC according to claim 10, wherein the UICC applications metadata includes category data identifying a category associated with each UICC application.

16. The UICC according to claim 10, wherein said UICC applications metadata is stored within an Elementary File, and wherein said USAT module is operable to provide the metadata from said Elementary File to the mobile device.

17. The UICC according to claim 10, wherein said USAT module is operable to provide said UICC applications metadata to the mobile device without a UICC service menu system provided by the USAT module.

18. The UICC according to claim 10, wherein said USAT module is operable to trigger the mobile device to perform a reset when said UICC applications metadata is updated.

19. A method performed in a mobile device that includes a Universal Integrated Circuit Card (UICC), the method comprising:

holding applications to be run by the mobile device in memory;

providing a user interface to allow a user to access applications;

obtaining, before or independent of any user interaction with the user interface, UICC applications metadata for UICC applications that are available on the UICC and storing the UICC applications metadata in said memory;

using the obtained UICC applications metadata to generate a user interface via which a user can select a UICC application to be launched; and in response to a user input selecting a UICC application, sending a command to the UICC to launch the selected UICC application, wherein said UICC applications metadata comprises conditions required to launch one of the UICC applications, and wherein the UICC module is operable, in response to the user selection of the UICC application, to check the conditions associated with the selected UICC application prior to sending the command to launch the selected UICC application.

20. A method performed by a Universal Integrated Circuit Card (UICC), the method comprising:

interfacing with a mobile device;

maintaining UICC applications and UICC applications metadata relating to the UICC applications in a memory of the UICC;

providing, before or independent of any user interaction with the UICC, said UICC applications metadata to the mobile device; and launching a UICC application in response to receiving a command to launch the UICC application from the mobile device, wherein said UICC applications metadata comprises conditions required to launch the UICC application for use by the mobile device to check that the required conditions have been met prior to sending the command to launch the UICC application.

21. A non-transitory computer readable memory comprising computer implementable instructions for causing a programmable mobile device to become configured as the mobile device of claim 1.

22. A non-transitory computer readable device causing a programmable UICC to become configured as the UICC of claim 10.

* * * * *